United States Patent [19]

Mango et al.

[11] 4,007,318
[45] Feb. 8, 1977

[54] PHOSPHORYLATED POLYSTYRENE AND METHOD FOR FORMING SAME

[75] Inventors: Louis A. Mango, III, Louisville, Ky.; Jimmy L. Webb, Saratoga, N.Y.

[73] Assignee: General Electric Company, Louisville, Ky.

[22] Filed: May 21, 1975

[21] Appl. No.: 579,435

[52] U.S. Cl. .................. 526/21; 260/932; 260/968; 526/27

[51] Int. Cl.² .......................... C07F 9/40

[58] Field of Search ..... 260/932, 968, 943, 93.5 A, 260/80 PS

[56] References Cited

UNITED STATES PATENTS

| | | | |
|---|---|---|---|
| 2,569,400 | 9/1951 | Butler | 260/886 |
| 2,911,378 | 11/1959 | Bregman | 260/2.2 |
| 3,051,740 | 8/1962 | Abramo et al. | 260/956 |
| 3,351,617 | 11/1967 | Jaeger et al. | 260/78.5 |
| 3,374,292 | 3/1968 | Zahir | 260/943 |
| 3,423,369 | 1/1969 | Nachbur et al. | 260/67.6 |
| 3,577,270 | 5/1971 | Guth | 117/136 |
| 3,639,532 | 2/1972 | Oertel et al. | 260/923 |
| 3,639,539 | 2/1972 | Nachbur et al. | 260/942 |
| 3,742,095 | 6/1973 | Walsh | 260/943 |
| 3,772,068 | 11/1973 | Hofmann | 117/136 |
| 3,800,010 | 3/1974 | Nachbur et al. | 260/943 |
| 3,808,292 | 4/1974 | Petersen et al. | 260/932 |
| 3,816,068 | 6/1974 | Rivlin | 8/115.7 |
| 3,865,796 | 2/1975 | Schmidt et al. | 260/80 PS |
| 3,903,337 | 9/1975 | Yamamoto et al. | 260/932 X |
| 3,908,051 | 9/1975 | Yamamoto | 260/932 X |

OTHER PUBLICATIONS

Cabasso et al., Journal of Applied Polymer Science, vol. 18 (1974) pp. 1969 to 1986.

*Primary Examiner*—Richard L. Raymond
*Attorney, Agent, or Firm*—Francis H. Boos

[57] ABSTRACT

A phosphorylatedpolystyrene having a phosphorus group bonded to a phenyl group by an intervening methylene-amido alkane group and being substantially non-crosslinked. The phosphorylated polystyrene is formed by a one-step process.

12 Claims, No Drawings

PHOSPHORYLATED POLYSTYRENE AND METHOD FOR FORMING SAME

BACKGROUND OF THE INVENTION

It is known that phosphorus-containing groups can be chemically incorporated into hydrocarbon polymers. This incorporation of phosphorus causes changes in the properties of the resulting material. These changes are, for example, resistance to ignition and combustion, improved adhesion to polar solids such as glass, ceramics, metals, etc., improved dyeability, increased hydrophilic properties, and the formation of a resultant material that is potentially suitable as an ion exchange resin precursor.

Phosphorylated polystyrene materials are generally formed by polymerization of a phosphorus-containing monomer, as in U.S. Pat. No. 3,051,740-Abramo et al, or by a chemical post modification of an existing polymer backbone with reactive phosphorus intermediates, as in the Journal of Applied Polymer Science, Vol. 18, P. 1969–1986 (1974).

The resultant products of the first method are generally intractable gels or low molecular weight products and are not suitable for most commercial applications. The second method is undesirably restricted in that few chemical reactions suitable for post modification of polystyrene are known which yield resultant products that do not have an unacceptable molecular weight charge or wherein the method used requires only a one-step reaction in order to provide a desirable phosphorylated material.

These problems were solved by the method of this invention which provides a direct, one reaction step process without substantial polymer chain degradation of gellation. The resultant product of this invention is a unique phosphorylated polystyrene having fire-resistance properties suitable for forming television cabinets.

SUMMARY OF THE INVENTION

In accordance with this invention, a copolymer of styrene and phosphorylated styrene has phosphorylated phenyl groups represented by the formula

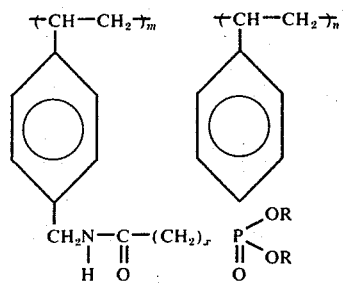

where R is an alkyl group having 1 to 6 carbon atoms, and the copolymer contains 0.1 to 10 wt. pct. phosphorus. The phosphorus group is bonded to the phenyl group by an intervening alpha-amido methyl group and said polystyrene copolymer is substantially non-crosslinked.

The copolymer is formed by contacting polystyrene and a N-hydroxymethyl (dialkyl phosphono) amide in the presence of a Friedel-Crafts catalyst consisting of stannic tetrachloride or boron trifluoride and a solvent under reacting conditions, said solvent being inert under said conditions and said catalyst being present in an amount of at least one mole of said catalyst per mole of said amide.

DETAILED DESCRIPTION OF THE INVENTION

In forming the copolymer of this invention, polystyrene is reacted with a N-hydroxymethyl (dialkyl phosphono) amide, or the corresponding chloromethyl or bromomethyl derivatives or corresponding alkyl ethers in the presence of a Friedel-Crafts catalyst consisting of stannic tetrachloride or boron trifluoride and a solvent under reacting conditions.

The polystryene used in this invention can be a non-crosslinked polystyrene homopolymer or a polystyrene copolymer containing saturated aliphatic comonomers. These polystyrenes can be, for example, styrene-isobutylene copolymers or a styrene-olefin-styrene block polymer known as for example Kraton-G, which is available commercially from the Shell Company, Houston, Tex.

In providing a flame retardant product, the particular polystyrene used in this invention must be a substantially non-crosslinked material. If the polystyrene is generally crosslinked, the resultant product of this invention will have undesirable fabrication properties. The N-hydroxymethyl-(dialkyl phosphono) amide can be, for example, N-hydroxymethyl-2-(diethyl phosphono) acetamide, N-hydroxymethyl-2-(dipropyl phosphono) acetamide, N-hydroxymethyl-3-(diethyl phosphono) propionamide, or N-hydroxymethyl-3-(dipropyl phosphono) propionamide.

These materials can be obtained by processes known in the art and as set forth in Lichtenthaler, F. W., The Chemistry and Properties of Enol Phosphates, Chem. Rev., 1961 (P. 613); Harvey, R. G., Tetrahedron, 22, 2561–2573 (1966); or Buehler, C. A., and Pearson, D. E., "Survey of Organic Synthesis," Wiley Interscience, C. 1970, P. 930. In particular, the structure of this intermediate must be such that it is soluble at reaction conditions in the particular styrene-solvent system to be utilized for the reaction.

The catalyst utilized in the method of this invention is a Friedel-Crafts catalyst consisting of stannic tetrachloride or boron trifluoride, which are known in the art.

The solvent utilized in the method of this invention is inert under the conditions of reaction as hereafter more fully described. The solvent can be, for example, nitromethane, nitropropane, methylene chloride, and nitrobenzene.

In the method of this invention, the polystyrene and the N-hydroxymethyl (dialkyl phosphono) amide are brought into contact in the presence of the Friedel-Crafts catalyst and the inert solvent at a temperature in the range of about 0° to 100° C, preferably 20° to 50° C, for a period in the range of about 1 to 8 hours, for example 2 to 4 hours.

The ingredients of the reaction mixture for providing a flame retarded product are in the preferred following ranges:

| | |
|---|---|
| Polystyrene | - 0.1 to 10 wt. pct. of solvent |
| N-hydroxymethyl (dialkyl phosphono) amide | - 0.25 to 3.0 moles per mole of styrene repeating units present |
| Catalyst | - Greater than 1.0 mole equivalent of phosphonated amide present Preferred range 1.1 to 2.0 moles per mole phos- |

| | |
|---|---|
| Solvent | phonated amide - An amount sufficient to provide a 0.1 to 10 wt. pct. solution of polystyrene |

Polystyrene concentrations at less than 0.1 wt. pct. of the solvent is not preferred because of solvent waste and the waste of time and labor in recovering reacted products from the solution.

Polystyrene concentrations at greater than 10 wt. pct. of the solvent is not preferred because of mechanical difficulties involved in mixing the resulting viscous mixtures and increased tendency of the system to form gels at high reactant concentration.

N-hydroxymethyl (dialkyl phosphono) amide concentrations at less than 0.25 moles per mole of styrene repeating units present is not preferred because resultant improvement in fire resistant properties will be less than desirable.

N-hydroxymethyl (dialkyl phosphono) amide concentrations at greater than 3.0 moles per mole of styrene repeating units present is not preferred because less than desirable enhancement in the degree of phosphorus substitution occurs and the use of additional amounts of reactant represents a waste of intermediates.

Catalyst concentrations less than 1.0 moles per mole of phosphonated amide are undesirable because a 1:1 catalyst to phosphonate complex occurs prior to polystyrene substitution. Thus, catalyst ratios less than one are not efficient in promoting the phosphorylation reaction.

The resultant styrene-phosphorylated styrene copolymer of this invention contains phenyl groups and is represented by the formula

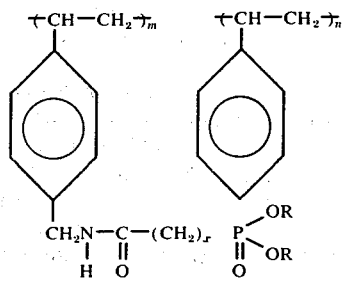

where R is an alkyl group having about 1–6 preferably about 2–4, carbon atoms and the copolymers contain about 0.1 to 10.0, preferably about 4.0 to 8.0 wt. pct. phosphorus. The phosphorus group is bonded to the phenyl group by an intervening methylene-amido alkyl group and said polystyrene copolymer is substantially non-crosslinked and has the properties of being flame-resistant and char-forming when subjected to a flame.

The phosphorus is present in the form of a phosphonate. The carbon-phosphorus bond of the phosphonate is connecting the phosphorus to a carbonyl group of the amide.

The R in the product of this invention is preferably ethyl, propyl or butyl, the x is preferably an integer of 1, 2, or 3, and the polymer can be a styrene or saturated hydrocarbon-styrene copolymer.

The resultant product of the reaction is in a solution. The product of this invention can be separated by contacting the product of reaction with methanol or other suitable non-solvent to form a precipitant and separating the precipitant which is the flame retardant polymer of this invention from the solution by filtration, decantation, or other methods known in the art.

The following are examples of the method of this invention for forming a flame retarded product.

EXAMPLE 1

112.5 g (0.5 mole) of N-hydroxymethyl-2-diethyl phosphono acetamide $(EtO)_2P(O)CH_2C(O)NACH_2OH$(DHMAP) were added to 50 g (0.48 mole repeating units) of polystyrene ($\overline{M}_w = 281,000$; $\overline{M}_n = 99,950$) predissolved in 1125 cc of dry, redistilled 1-nitropropane at 26° C under a nitrogen blanket. 75cc (0.625 mole) of stannic tetrachloride catalyst was then added slowly by syringe in four equal portions. The system initially exothermed to approximately 50° C and was allowed to cool slowly to the starting temperature of 26° C. After 1.75 hours, the reaction was terminated by addition of 400cc of tetrahydrofuran. Solid polymer was isolated by precipitation from methanol using a spark-free blender. After purification and drying in vacuo, an infrared examination was performed and indicated a highly substituted product. Elemental analysis indicated 2.77% nitrogen, equivalent to 34.5% of repeating units substituted. When contacted with an ignition source, samples of this material initially burn slowly, form heavy self-supporting chars, and then self-extinguish, as described more fully in Example 2.

EXAMPLE 2

90.0 g (0.4 mole) of N-hydroxymethyl-2-diethyl phosphono acetamide (DHMAP) were added to 16 g (0.15 mole repeating units) of polystyrene predissolved in 400cc of dry, redistilled 1-nitropropane at 26° C and under a nitrogen blanket. 60cc (0.50 mole) of stannic tetrachloride was added in two equal portions by syringe after an exotherm to 60° C. The system was allowed to recool to 26° C and to react for a total of 3 hours. The reaction was terminated by tetrahydrofuran addition and prepared as in Example 1. Elemental analysis gave 2.08% N equivalent to 23% conversion of repeating units. Three samples, approximately 1 g each, were dried and immersed in a Meeker burner flame for 10 seconds. The samples were removed and allowed to burn under ambient conditions until they self-extinguished. The resulting material was examined and reweighed.

TABLE I

| Sample No. | Init. Wt. | Final Weight After 10" Flame Contact and Combustion | Percent Wt. Loss | Comments |
|---|---|---|---|---|
| 1 | 1.13 | 0.28 | 75 | All samples form self-supporting chars and do not emit flaming drops at any |
| 2 | 0.84 | 0.20 | 76 | |
| 3 | 0.80 | 0.20 | 75 | |

TABLE I-continued

| Sample No. | Init. Wt. | Final Weight After 10" Flame Contact and Combustion | Percent Wt. Loss | Comments |
| --- | --- | --- | --- | --- |
| Polystyrene Standard | 2.22 | 0.13 | 94 | time during combustion. Plastic runs and emits flaming droplets upon flame contact. |

As shown by the following examples, the choice of an appropriate reaction catalyst and use of catalyst to phosphonate reactant ratios greater than unity proved to be important considerations for effective phosphorylation.

The effect of varying catalyst type was examined using the PS-DHMAP system. A series of Friedel-Crafts catalysts were examined as a catalyst to phosphonate reactant ratio of 1.25 to determine their relative efficiency in affecting the DHMAP-aryl condensation reaction (TABLE II).

The most useful catalysts proved to be $SnCl_4$ and $BF_3$ which were both sufficiently active, and soluble in the reaction media. Various $BF_3$ complexes with weak Lewis bases (e.g., butanol or diethylether) proved useful but were less reactive and offered no advantages. $AlCl_3$ was ineffective. It precipitated completely out of solution upon addition to the reaction system. $TiCl_4$ and $FeCl_3$ were less active catalysts in the system and effected only minor substitution.

TABLE II

Effect of Catalyst Type for Polystyrene N-Hydroxymethyl-2-Diethyl Phosphono Acetamide Reaction

| Sample | Catalyst* | Temp. (° C) | Time (Min.) | % Subst. |
| --- | --- | --- | --- | --- |
| 1 | $TiCl_4$ | 30 | 240 | 1.1 |
| 2 | $FeCl_3$ | 30 | 240 | 1.5 |
| 3 | $AlCl_3$ | 30 | 360 | nil |
| 4 | $BF_3$ | 25 | 110 | 11.0 |
| 5 | $BF_3BuOH$ | 85 | 150 | 1.8 |
| 6 | $SnCl_4$ | 25 | 210 | H+ (by ir)** |
| 7 | $SnCl_4$ | 25 | 240 | 12.5 |

*Catalyst/amide ratio=1.25/1 for all samples, for samples 1,2,3,6, PS/Amide=1:1, for samples 5,4,7, PS/Amide=2:1.
**Designation assigned according to an arbitrary scale constructed to allow semi-quantitative comparison of IR spectra. The scale is based upon comparison of the amide band at 1680 cm⁻¹ vs. the styrene bands at 1601 cm⁻¹ and 1950 cm⁻¹ as follows:

For $\%T_{1680}$ > $\%T_{1955}$, Substitution = Low (L)
$\%T_{1955}$ > $\%T_{1680}$ > $\%T_{1601}$, Substitution = Medium (M)
$\%T_{1680}$ > $\%T_{1601}$, Substitution = High (H)
($\%T$ = % Transmission)

Empirically, it was found that (L) corresponds to 0 to 2% rings substituted; (M) from 2 to 8%; and (H) from 8% up.

As shown in TABLE III, for both $BF_3$ and $SnCl_4$ catalysis, catalyst to phosphonate ratios of one or less (samples No. 8, 10, 11, 12) afford less than desirable phosphorylation. When, however, a ratio above one was used (samples No. 9, 13) desirable phosphorylation was obtained. These results indicate that a 1:1 catalyst-to-phosphonate complex occurred which preferentially deactivated one mole equivalent of catalyst.

TABLE III

Effect of Catalyst to Phosphonate Ratio On Polystyrene Phosphoralkylation (A) DHMAP INTERMEDIATE

| Sample | Catalyst | Catalyst/DHMAP | Temp (° C) | Time (Min.) | %Subst. |
| --- | --- | --- | --- | --- | --- |
| 8 | $BF_3$ | 0.6 | 5 | 90 | 0 |
| 9 | $BF_3$ | 2.6 | 25 | 90 | 8.9 |
| 10 | $SnCl_4$ | 0.4 | 50 | 180 | 1% |
| 11 | $SnCl_4$ | 0.95 | 25 | 60 | 2.4 |
| 12 | $SnCl_4$ | 1.00 | 25 | 240 | 1.3 |
| 13 | $SnCl_4$ | 1.25 | 25 | 150 | 20.2 |

Other modifications and alterations of this invention will become apparent to those skilled in the art from the foregoing discussion, and it should be understood that this invention is not to be unduly limited thereto.

What is claimed is:
1. A copolymer of styrene and phosphorylated styrene, said copolymer being represented by the formula

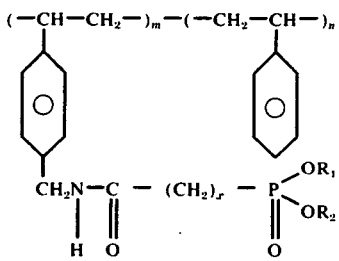

where $R_1$ and $R_2$ are alkyl groups having 1 to 6 carbon atoms and $x$ has a value of 1, 2, or 3, the copolymer contains 0.1 to 10 wt. pct. phosphorus, said polystyrene copolymer being substantially non-crosslinked.

2. A copolymer, as set forth in claim 1, wherein the alkyl groups have carbon atoms in the range of 2 to 4 per molecule.

3. A copolymer of styrene and phosphorylated styrene, said copolymer being represented by the formula

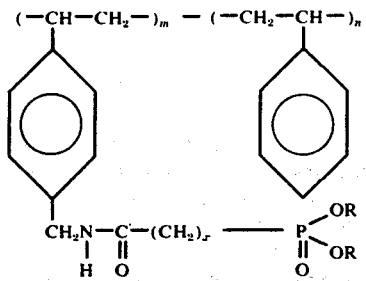

where R is an alkyl group having 1 to 6 carbon atoms and $x$ has a value of 1, 2, or 3, the copolymer contains 0.1 to 10 wt. pct. phosphorus, said polystyrene copolymer is substantially non-crosslinked, said copolymer of styrene and phosphorylated styrene being the result of reacting a N-hydroxymethyl (dialkyl phosphono) amide and polystyrene, a polymer having repeating styrene units, in concentrations in the range of about 0.25 moles to about 3.0 moles of amide per mole of styrene repeating unit.

4. A copolymer, as set forth in claim 1, wherein R is ethyl.

5. A copolymer, as set forth in claim 1, wherein R is butyl.

6. A process for forming a phosphorylated styrene copolymer comprising:
contacting polystyrene, a polymer of repeating styrene units, and a N-substituted (dialkyl phosphono) amide of the general formula:

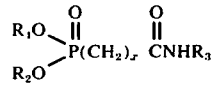

wherein $R_1$ and $R_2$ are alkyl groups having 1 to 6 carbon atoms, $x$ has the value of 1, 2, or 3, and $R_3$ is selected from the group consisting of hydroxymethyl, chloromethyl, bromomethyl, and alkoxymethyl, in the presence of a Friedel-Crafts catalyst consisting of stannic tetrachloride or boron trifluoride and a solvent, at a temperature in the range of about 0° to about 100° C., the styrene polymer being present in an amount in the range of about 0.1 to about 10 wt. pct. of the solvent and the concentration of the N-substituted (dialkyl phosphono) amide being in the range of about 0.25 to about 3.0 moles per mole of styrene repeating unit, said solvent being inert under said conditions and said catalyst being in an amount of at least one mole of said catalyst per mole of said amide.

7. A process, as set forth in claim 6, wherein the reaction is continued for a period in the range of about 1 to about 8 hours.

8. A process, as set forth in claim 6, wherein the alkyl groups of the N-substituted (dialkyl phosphono) amide are in the range of 2 to 4 carbon atoms per molecule.

9. A process, as set forth in claim 6, wherein the alkyl radicals are ethyl.

10. A process, as set forth in claim 6, wherein the N-substituted group of the N-hydroxymethyl (dialkyl phosphono) amide is one of N-chloromethyl or N-bromomethyl.

11. A process, as set forth in claim 6, wherein the styrene copolymer has flame-resistant properties and is separated from the product of reaction by contacting the product of reaction with methanol to form a precipitant and thereafter separating the precipitant.

12. A process, as set forth in claim 6, wherein the catalyst is present in the range of about 1.1 to about 2.0 moles per mole of phosphonated amide.

* * * * *

UNITED STATES PATENT OFFICE
CERTIFICATE OF CORRECTION

PATENT NO. : 4,007,318
DATED : February 8, 1977
INVENTOR(S) : Louis A. Mango III/Jimmy L. Webb It is certified that error appears in the above—identified patent and that said Letters Patent are hereby corrected as shown below:

Claim 10, Column 8, line 37, after N-substituted, delete "group of the N-hydroxymethyl".

Signed and Sealed this

Twenty-sixth Day of April 1977

[SEAL]

Attest:

RUTH C. MASON
*Attesting Officer*

C. MARSHALL DANN
*Commissioner of Patents and Trademarks*